United States Patent

[11] 3,551,651

| [72] | Inventor | Rienk Pieter Offereins<br>Hengelo Overijsel, Netherlands |
|---|---|---|
| [21] | Appl. No. | 580,283 |
| [22] | Filed | Sept. 19, 1966 |
| [45] | Patented | Dec. 29, 1970 |
| [73] | Assignee | N. V. Hollandse Signaalapparaten<br>Hengelo (Overijsel), Netherlands<br>a firm of the Netherlands |
| [32] | Priority | Sept. 9, 1966 |
| [33] |  | Netherlands |
| [31] |  | No. 6612714 |

[54] ARRANGEMENT FOR DIGITALLY ESTABLISHING A VALUE
3 Claims, 5 Drawing Figs.

[52] U.S. Cl. ................................................ 235/92
[51] Int. Cl. ..................................................... H03k 21/10
[50] Field of Search ........................................... 235/92;
340/347A/D; 325/325; 329/107

[56] References Cited
UNITED STATES PATENTS

| 2,800,276 | 7/1957 | Harper | 235/92 |
| 2,803,405 | 8/1957 | Howell | 235/92 |
| 2,813,676 | 11/1957 | Boyer et al. | 235/92 |

*Primary Examiner*—Maynard R. Wilbur
*Assistant Examiner*—Charles D. Miller
*Attorney*—Frank R. Trifari ABSTRACT: A device for establishing a digital value between two electrical signals including a binary counter, a control circuit and a source of counting pulses. The control circuit responds to a measure order signal for preparing the counter to be set to a unit on previous to the zero position. The control unit then permits the counter to count until a reference or measure pulse is reached. The control signal responds to the first pulse to stop the counter and to the second to stop and complement the counter, thereby providing digitization of the period in either case.

INVENTOR
RIENK P. OFFEREINS
BY
AGENT

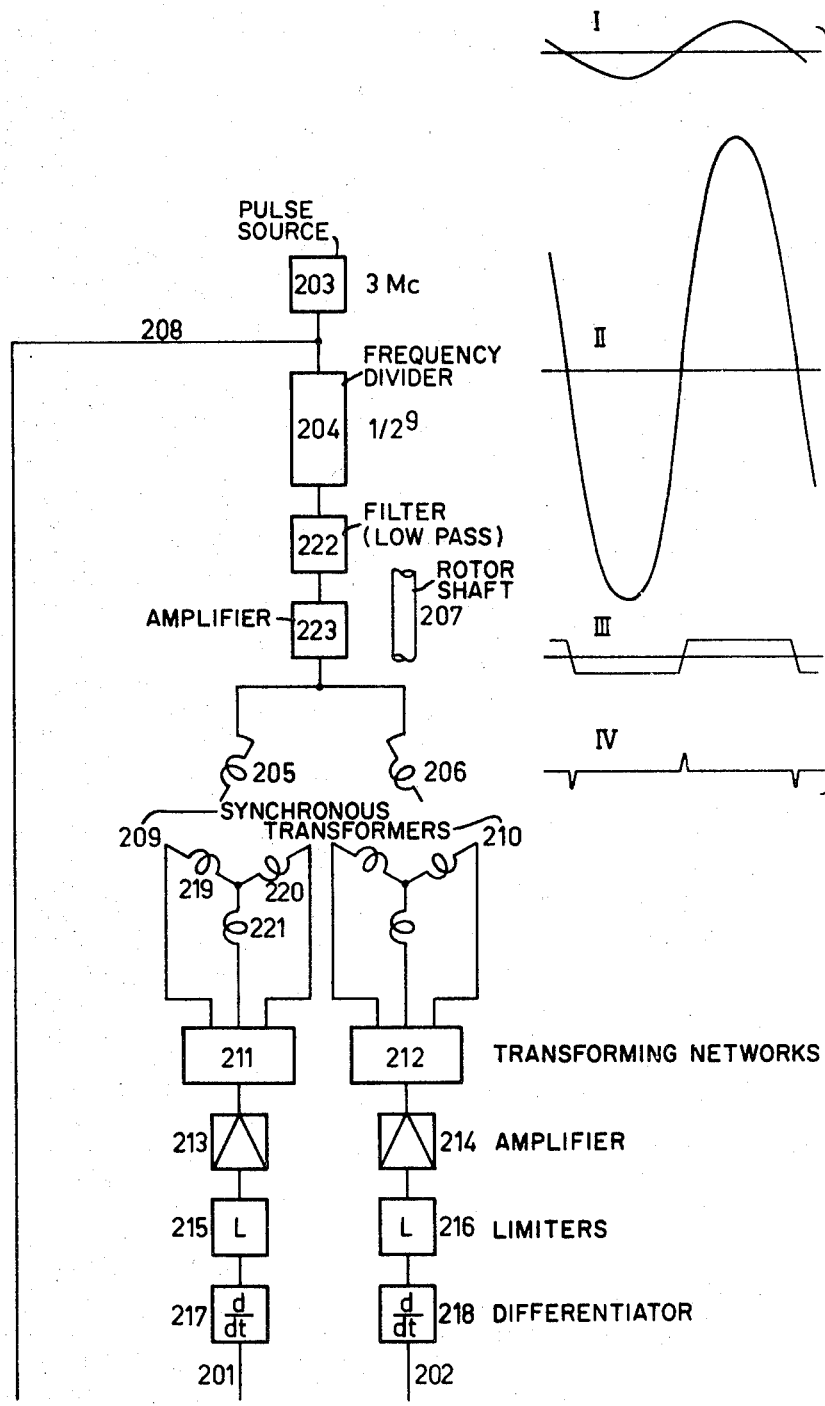

ARRANGEMENT FOR DIGITALLY ESTABLISHING A VALUE

This invention relates to an arrangement for digitally establishing a measured value that is represented by a measuring interval situated between two successive electrical signals, the phenomena occur in pairs in such a way that the sum of the intervals between such a phenomenon and the two electrical signals occurring directly on either side of this electrical signal has a constant value that is independent of the measured value as long as this measured value remains constant. The measured value is established, after the receipt of an electric signal constituting a measuring order, by causing an electronic counter to count pulses with a frequency that is constant with respect to the recurrence frequency of the measuring intervals during an interval that begins at the occurrence of the first electrical signal that follows on the measuring order and limits a measuring interval, and ends at the occurrence of the second electrical signal that follows on the measuring order and limits a measuring interval.

In an arrangement of this type the counter will actually supply the measured value itself if the counting operation has been started by the electrical signal that marks the beginning of a measuring interval. If the counting operation has been started by the electrical signal that marks the end of a measuring interval, and no special measures are taken, the counter will supply the complement of the measured value with respect to the number of pulses that the source of pulses supplies during an interval, the duration of which corresponds to the sum of the durations of the intervals between a phenomenon limiting a measuring interval and the two electrical signals limiting measuring intervals occurring directly on either side of said electrical signal.

In connection therewith a known arrangement of the type defined above uses a counter that can count backwards and forwards. If the counting operation has been started by the electrical signal that marks the beginning of a measuring interval, the counter will count in a forward direction because it receives the pulses by way of a certain one of two input circuits, and the setting of the counter reached at the end of the counting operation will correspond to the measured value represented by the duration of the measuring interval. If the counting operation has been started by the electrical signal marking the end of a measuring interval, however, the counting pulses are supplied to a second input circuit of the counter with the result that the counter will count backwards during a time interval situated between two successive measuring intervals, and because the counter is designed to perform a complete cycle on the receipt of the number of pulses that, in the case of a constant measured value, the pulse-source supplies during an interval, the duration of which corresponds to the sum of the durations of the intervals between an electrical signal limiting a measuring interval and the two electrical signals limiting measuring intervals and occurring directly on either side of said electrical signal, in this case also the setting reached by the counter will correspond to the measured value itself.

It is a disadvantage of this arrangement that its counter must be able to operate in either direction, for such counters are expensive and complicated, and certain types of such counters (especially counters with two trigger circuits per bit, and able to operate on pulses the duration of which is longer than that of the switch over of the countertrigger circuits) require a special control circuit for reversing their direction of operation.

In the U.S. Pat. No. 3,343,095 of the same applicant, an arrangement of the type to which the invention is related, has been developed in which the counter needs only to be able to count forwards. The counter in this arrangement starts counting from its zero-position, and in order to perform a complete cycle it needs the number of pulses that, in the case of a constant measured value, the pulse-source supplies during an interval, the duration of which corresponds to the sum of the durations of the intervals between an electrical signal limiting a measuring interval and the two electrical signals occurring directly on either side thereof, and each limiting a measuring interval. If the counting operation has been started by an electrical signal that is the first one limiting a measuring interval, the counting operation having been completed, the state of each countertrigger circuit will be read by way of a certain one of its two output circuits and the counter in this way will supply the measured value itself. If, however, the counting operation has been started by a phenomenon that marks the end of a measuring interval, the arrangement will proceed according to one of the two following methods. According to the first of these methods first all trigger circuits storing bits in a binary counter are switched over to the position other than that reached during the counting operation; one pulse is then supplied to the counter, and thereafter the counter is read by way of the same trigger output circuits as after a counting operation that has been started by an electrical signal constituting the first limit of a measuring interval. The counter then supplies the value itself. This method is especially suitable for counters that react to short pulses the duration of which is shorter than the time required to switch over a counter trigger circuit. According to the second method, after a counting operation that has been started by an electrical signal that marks the end of a measuring interval, the counter is read with the aid of the output circuits of the counter trigger circuits other than those used when reading the counter after a counting operation that has been started by an electrical signal that marks the beginning of a measuring interval, one unit, however, being added by means of an adding network to the value read in this way. It is a serious disadvantage of the arrangement just described that, for performing a digitalizing operation comprising a counting operation that has been started by an electrical signal that marks the end of a measuring interval, the arrangement either must comprise a complicated adding network for reading the setting of the counter, or must perform two additional cycles that are not required if the counting operation has been started by an electrical signal that marks the beginning of a measuring interval.

It is the object of the present invention to substantially avoid these disadvantages, and for this purpose the arrangement according to the invention is built in such a way that the binary counter that performs a complete cycle on the reception of the number of pulses that, in the case of a constant measured value, the pulse source supplies during an interval the duration of which corresponds to the sum of the durations of the intervals between an electrical signal limiting a measuring interval and the electrical signals, each limiting a measuring interval, and occurring directly on either side of said phenomenon. The counter starts counting in a position situated one unit before the zero position, and means are provided to supply one additional counting pulse to the counter before it is read, if the counting operation has been started by an electrical signal marking the beginning of a measuring interval. Means are furthermore provided for controlling, after a counting operation that has been started by an electrical signal marking the end of a measuring interval, the reading of a value that is one unit lower than the complement of the value stored by the counter, either by switching over all counter trigger circuits to the position other than that reached during the counting operation before the reading takes place, or by switching over the conductors for reading the positions of the counter trigger circuits to the output circuits of these trigger circuits other than those by way of which the reading is effected after a counting operation started by an electrical signal marking the beginning of a measuring interval. If, in an arrangement according to the invention, reading of the counter is always effected by means of the same set of output circuits of the counter, then, if the counting operation has been started either by the one or by the other electrical signal limiting a measuring interval, the number of additional cycles to be performed is the same and only one. If, depending on the electrical signal that has started the counting operation, the counter is read by way of different sets of output circuits, the number of additional cycles to be performed before reading takes place remains one, and this one cycle is moreover, superfluous in one of the two cases. Moreover, the circuit arrangement becomes less complicated because no adding network is required.

The electric phenomena limiting the measuring intervals may, for instance, be short electric pulses, but also different edges of the same pulse with variable duration or predetermined edges of different pulses with variable relative moment of occurrence. The character of the said phenomena and the way in which they are generated are, however, irrelevant to the application of the invention, provided that the conditions related to their recurrence mentioned above are fulfilled. In the description of embodiments of the invention, methods for generating the electrical signals will be described.

The invention can be applied, for instance, in systems operating according to the pulse interval method and the pulse duration method as well as in arrangements for determining range by means of the pulse-echo method.

In order that the invention may be more clearly understood embodiments of the invention will now be described with reference to the drawings, in which:

FIG. 2 shows a circuit arrangement for generating the electric signals limiting the measuring intervals;

FIG. 3 shows diagrams of the operation of the circuit arrangement according to FIG. 2;

Figures 1, 1A:
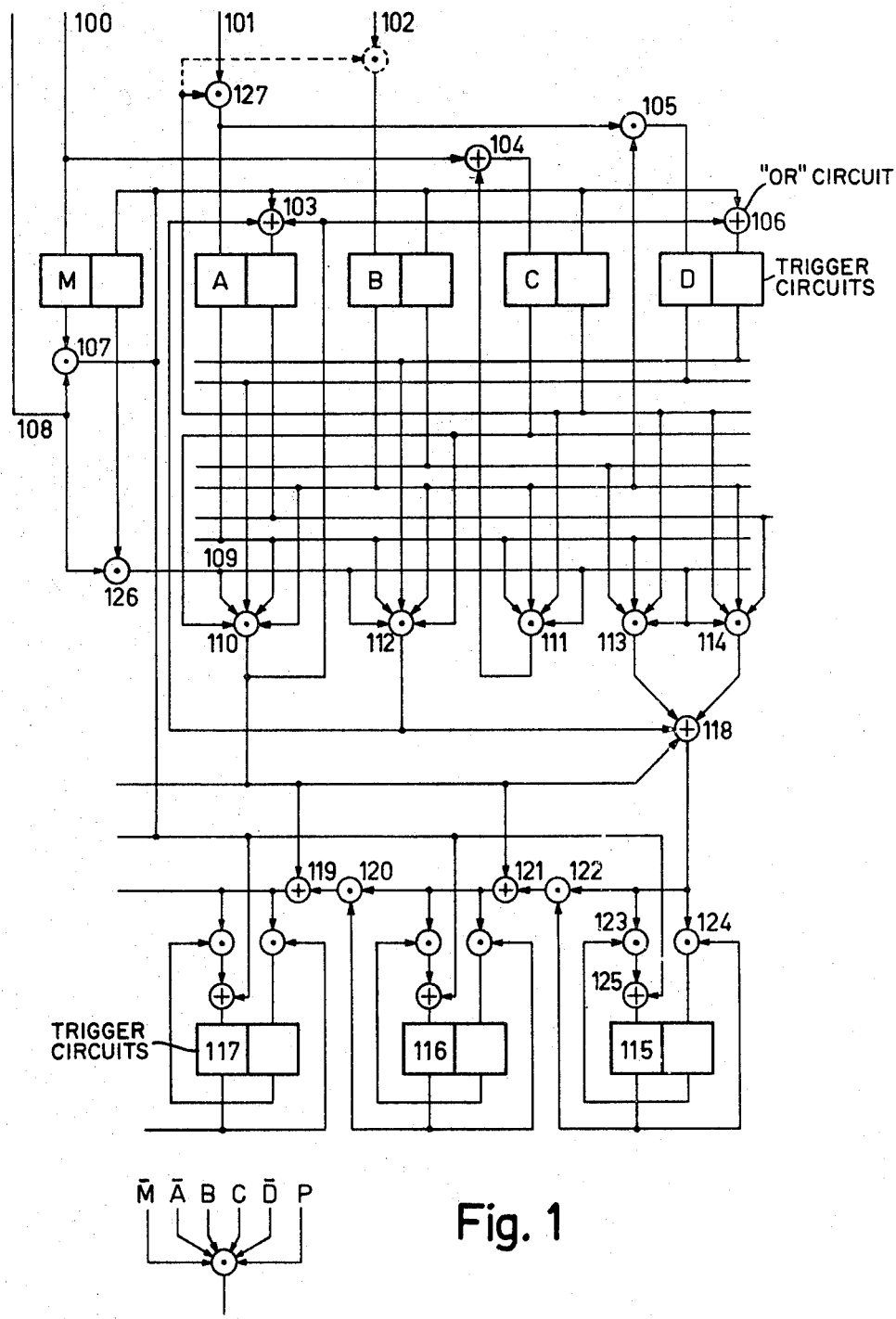
FIG. 1 shows a counter circuit for digitalising values according to the invention.
FIG. 1A shows an example of "AND" circuit operation.

In the embodiments of the invention to be described hereinafter, the measuring interval corresponding and proportional in duration to the measured value to be digitalizing is limited by two very short measuring pulses. Each of these pulses is derived by means of circuit arrangements to be described below, from the output voltages of the three-phase windings of a corresponding synchronous transformer (209, 210), the rotor of which carries a single-phase winding (205, 206), that is fed by a single-phase alternating voltage. The rotor of one of these synchronous transformers, the transformer 209, the polyphase-winding of which carries the references 219, 220, 221, has a fixed adjustment, and this synchronous transformer partakes in generating a fixed reference pulse that recurs at a fixed moment in each period of the supply voltage of the rotor winding of the synchronous transformer. This reference pulse is one of the measuring pulses limiting the measuring interval, and in the embodiments to be described it is the first limit of such an interval, although systems in which the reference pulse constitutes the second limit of a measuring interval can be used just as well. This interchange only requires an interchange of the connections between the pulse sources and the counter circuit. The rotor of the other synchronous transformer 210 is adjusted, by means of a shaft 207, in accordance with the position of an object, the position of which is a measure for the measured value to be digitalizing This synchronous transformer partakes in generating the other measuring pulse, hereinafter called "endpulse," that constitutes the second limit of the measuring interval, and the moment of occurrence of which is determined by the measured value.

The supply voltage of the two synchronous transformers is derived, by means of a frequency divider 204, from the output voltage of a pulse generator with a pulse-frequency of 3 Mc. The frequency divider is a binary counter so that it supplies a square-wave voltage. It has 9 positions, so that it divides by $2^9$, and consequently supplies a square wave voltage with a frequency of about 5859 c.p.s. The synchronous transformers, however, require supply voltages that are sine-functions of time. Such a voltage is derived from the output voltage of the frequency divider by means of a lowpass filter 222. The output voltage of the lowpass filter is too weak to be used as supply voltage for the synchronous transformers, and for that reason Under these circumstances the three-phase stator windings of each of the synchronous transformers supply three alternating voltages with the same frequency and phase as the supply voltage, but with amplitudes that are different sine-functions of the angular position of the relative synchronous transformer rotor. Networks are available that can transform these three voltages into a voltage with a constant amplitude and a frequency that is equal to that of the supply voltage, but with a phase angle that shows a constant difference with respect to the setting angle of the transformer rotor. It is presumed that in the present case the network described in the U.S. Pat. No. 3,401,330 of the same applicant as that of the present application is applied for this purpose. Curve I in FIG. 3 shows the change as a function of time of the output voltage of such a network.

In the arrangement described here the setting of the rotor of the synchronous transformer 209 that partakes in the generation of the reference pulse, and the relative position in which the rotor of the other synchronous transformer and the object the position of which corresponds to the value to be digitalised are coupled to each other are such that two zero-passages in predetermined directions of the output voltages of the networks connected to the output circuits of different synchronous transformers and occurring successively in a predetermined sequency constitute the limits of a measuring interval. The counter circuits to be controlled do not react, however, to zero-passages; they need short pulses for their control. Short pulses can, as a rule, be derived from other voltages by differentiation, but differentiation of a sine-shaped voltage leads once more to a sine-shaped voltage. For this reason the following procedure is applied. The output voltages of the networks are amplified by means of the amplifiers 213 and 214, which then supply voltages that can be represented by the voltage curve II in FIG. 3. These voltages are applied to limiter circuits 215, and 216, which under these circumstances, supply voltages that can be represented by the curve III in FIG. 3. These voltages are differentiated in the differentiating circuits 217 and 218. These differentiators then supply short pulses at the moments of the occurrence of the zero-passages of the output voltages of the networks 211 and 212. Positive pulses result from zero-passages in the one direction and negative pulses from zero-passages in the other direction. The pulses supplied in this way by one of the differentiator circuits can be represented by the curve IV in FIG. 3. It is desirable for these pulses to be very short, for only very short pulses permit accurate digitalizing only very short pulses are always able to start and to stop the counter exactly at the correct moments. For this reason the edges of the curve representing the output voltages of the limiter circuits must be steep, and in order to obtain such steep edges the output voltages of the networks are amplified before they are supplied to the limiter circuits as described above. The selection of the pulses corresponding to zero-passages in a predetermined direction is effected by the counter circuit which, for this reason, reacts only to pulses of predetermined polarities; in the embodiments to be described they react only to positive pulses.

The pulses obtained in the way described above constitute the electrical signals or phenomena limiting a measuring interval, mentioned in the preamble. They satisfy the condition that, in the case of a constant measured value, the sum of the intervals between such a phenomenon and the two phenomena occurring directly on either side thereof is constant. Starting from a measuring pulse, this sum is equal to the duration of the interval between two successive reference pulses and starting from a reference pulse said sum is equal to the interval between two successive measuring pulses. The interval between two successive reference pulses is constant and always equal to the duration of a period of the supply voltage of the synchronous transformers, that is $2^9 / 3.10^6$ sec. while the duration of the interval between two successive measuring pulses has the same value, independently of the measured The counter circuit that effects the digitalizing will now be described. This counter circuit is shown in FIG. 1. and if this FIG. is placed under FIG. 2, a complete circuit of an arrangement according to the invention is obtained. By way of the circuit 208, 108 the counter circuit receives the pulses produced by the pulses generator 203. It uses these pulses as stepping-or counting pulses for the counter, and as control pulses for its own trigger circuits. The reference pulses flow to the counter circuit by way of conductor 201, 101, while the end-pulses, the moment of occurrence of which depends on the measured value to be digitalised, are received by way of circuit 202, 102. The counter is shown in the lower part of FIG. 1 and is a counter of a well-known type with one trigger circuit per bit. It is driven by counting pulses that reach it by way of OR circuit 118. During the interval between two successive reference pulses, the duration of which interval is equal to the duration of one period of the supply voltage of the synchronous transformers, it is necessary for the counter to effect one complete cycle, for only then will the counter that starts its operation from a quiescent position that is situated one unit before the zero-position supply the correct value after the switch over of its trigger circuits in the case of the counting operation having been started by the last of the two pulses limiting a measuring interval, that is by the end-pulse. The supply voltage of the synchronous transformers is derived from the output voltage of the pulse generator by means of a frequency divider, that divides by $2^9$. This generator consequently supplies $2^9$ pulses during one period of the supply voltage of the synchronous transformers and during the interval with the same duration between two successive references pulses. One cycle of the counter must therefore correspond to $2^9$ pulses, and for that reason the counter must comprise 9 trigger circuits, each of them storing one bit.

The pulses that are to switch over the trigger circuits in the counter are supplied to both input control circuits of these trigger circuits. An AND circuit is inserted in each of these control circuits (AND circuits 123 and 124 in the input circuits of the trigger circuit 115, which is the trigger circuit storing the lowest bit in the counter). Each of these AND circuits is controlled by that output voltage of the trigger circuit to which the input circuit in which the AND circuit is inserted belongs, which makes the AND circuit conductive for pulses if the trigger circuit is in the other condition than that to which it is switched over by a pulse supplied by way of said AND circuit. This means that a counting pulse supplied to the two input control circuits causes the switch over of the trigger circuit. The pulses are of very short duration; they only initiate the switch over which is completed after the initiating pulse has already come to an end, but before the next pulse is received. For this reason a pulse can switch over the trigger circuit only once. After the switch over, however, the trigger circuit is ready in time to react to the next pulse.

If a counter trigger circuit that does not store the highest bit in the counter is in the state in which it stores a 1 bit (the set state in the counter described here) it makes an AND circuit (AND circuit 122 for trigger circuit 115, AND circuit 120 for trigger circuit 116) in the connection between the pulse supply circuit for the trigger circuit that controls the AND circuit and the trigger circuit that stores the next higher bit, conductive for the pulses controlling the trigger circuit first mentioned. Because of the relatively slow operation of the trigger circuits the pulse that switches over a trigger circuit to the state in which it makes the AND circuit leading to the next higher trigger circuit conductive is itself unable to pass said AND circuit, but the pulse that switches the trigger circuit back to the state in which it makes said AND circuit nonconductive, will, as a result of the slow operation, be able to pass the AND circuit, and reach the trigger circuit storing the next higher bit, and switch it over. Consequently each of the trigger circuits in the counter only receives half of the pulses supplied to the previous or next lower trigger circuit in the counter. Hence the counter counts in the binary system.

In order that the operation of the control circuits for the counter may be clearly understood it is to be noted that the time interval required for switching over the trigger circuits has a duration longer than that of the pulses controlling them. Hence a pulse that is to switch over such a trigger circuit only initiates the switch over, and has already come to an end before the switch over is completed, and this pulse can pass an AND circuit that is conductive before the switch over has taken place, but cannot pass an AND circuit that becomes conductive after the switch over. The switch over is completed before the next pulse is supplied by the pulse generator.

The measuring order that is to start a digitalizing operation is a short pulse that reaches, by way of conductor 100, the control circuit of FIG. 1. It sets the trigger circuit M by way of a direct connection, and trigger circuit C by way of OR circuit 104. The next pulse received from the pulse generator will then be able to pass AND circuit 107, made conductive by trigger circuit M in its set state. In the first place this pulse sets the counter to its quiescent position, for which reason it reaches the left control input circuits of all counter trigger circuits by way of OR circuits inserted in these input circuits (OR circuit 125 for trigger circuit 115). The counter then stores 111111111 and consequently is positioned just one unit before the zero position. Even should the counter be accidentally engaged in a digitalizing operation at the moment of its resetting to its quiescent position, the resetting operation would not be disturbed, for the AND circuit 126 prevents the passage of counting pulses to the counter as long as the trigger circuit M is in the set state, while, moreover, the trigger circuit C in it its set state makes the AND circuits 113 and 114 in the counting pulse supply circuit for the counter nonconductive for counting pulses. The pulse that passes the AND circuit 107 also resets the trigger circuits M, B and C by way of a direct connection, the trigger circuit A by way of OR circuit 103 and the trigger circuit D by way of OR circuit 1 106. Also in this state of the control circuit there is no route for the counting pulses received from the pulse generator to the counter, because, owing to the combination of states of the trigger circuits now reached, none of the AND circuits by way of which these pulses might reach the counter can be conductive for these pulses. The circuit arrangement now waits for the first pulse limiting a measuring interval to be received. Be it presumed that in this case the first pulse to be received is the reference pulse supplied by way of conductor 101. This pulse sets the trigger circuit A, but cannot reach the trigger circuit D because the AND circuit 105 cannot let this pulse pass as long as trigger circuit B is in the reset state. Trigger circuit A being in the set state, and trigger circuits B and C in the reset state, AND circuit 113 is conductive, so that pulses can flow by way of this AND circuit and OR circuit 118 to the counter and cause it to step. As soon as the measuring interval, the beginning of which was marked by the reference pulse that has set trigger circuit A has come to an end, an end-pulse that constitutes the aftermost limit of the measuring interval is received by way of conductor 202, 102. This pulse sets the trigger circuit B, so that the AND circuit 113 can no longer let pulses pass to the counter. The counting operation forming part of the digitalization is now completed. As trigger circuit C is still in its reset state, while trigger circuits A and B are in the set state, a pulse can flow by way of AND circuit 111 and OR circuit 104 to the left control circuit of trigger circuit C and set it. In the first place this makes the supply of counting pulses to the counter by way of AND circuit 113 or 114 definitely impossible until a new measuring order has been received. Moreover, because trigger circuits A, B and C are now in the set state, and trigger circuit D is in the reset state, the next pulse received form the pulse generator 203 by way of conductor 108 can flow as an additional counting pulse through AND circuit 112 and OR circuit 118 to the counter, so that one unit is added to the value stored in the counter. As a result of this additional counting pulse the counter reaches the setting corresponding to the duration of the measuring interval, although the counter has started to count from a quiescent position that is situated one unit before the zero position. In order to prevent the AND circuit 112 from supplying more than one pulse to the counter, this pulse also flows by way of OR circuit 103 to the right control circuit of trigger circuit A, so that this trigger circuit is reset. Hence no further pulses can flow by way of AND circuits 110 and 112 to the counter, while AND circuits 111, 113 and 114 can no longer conduct pulses because trigger circuit C is in the set state. The state now reached by the counter circuit, in which state the trigger circuits M, A and D are in the reset condition and the trigger circuits B and C are in the set condition, is the quiescent state of the arrangement. It shows that the digitalizing operation has been completed and that the counter can be read. This fact is signalled to the data handling system that is to receive the digitalized value by means of an AND circuit shown in FIG. 1A. If the trigger circuits are in the states mentioned above, this AND circuit lets pulses pass to said data handling system. The trigger circuit A remains in the reset state until, after a measuring order has been received, a reference pulse is supplied to the circuit arrangement. Reference pulses received in the meanwhile before a new measuring order has been received cannot reach the trigger circuit because AND circuit 127 does not let these pulses pass as long as trigger circuit C is in the set state, and it remains in this state until a measuring order has been received. Consequently the reference pulses that will continue to reach the counter circuit are unable to disturb its quiescent condition.

Be it now presumed that the first pulse limiting a measuring interval to reach the counter circuit after a measuring order pulse has been received, and has initiated the resetting of all trigger circuits in the counter circuit, is an end-pulse that marks the end of a measuring interval. This pulse is supplied by way of circuit 202, 102 and sets trigger circuit B. Trigger circuits A and C being now in the reset state, and trigger circuit B being in the set state, counting pulses received from pulse generator 203 by way of conductor 208, 108 can flow by way of AND circuit 114, that has now become conductive, and OR circuit 118 to the counter, which then starts counting. As soon as the next measuring interval begins, a reference pulse that marks the beginning of this next measuring interval is supplied by way of circuit 201, 101. In the first place this pulse sets trigger circuit A, so that the AND circuit 114 becomes nonconductive, and counting pulses can no longer reach the counter. Moreover, this reference pulse reaches the left control circuit of trigger circuit D because trigger circuit B is in the set state, and hence AND circuit 105 is conductive. Consequently trigger circuit D is set. The fact that trigger circuit D is in the set state shows that the counting operation took place during the interspace between two measuring intervals and that consequently the counter, that started to count from a quiescent position that is situated one unit before the zero setting, has counted a number of pulses that corresponds to the complement diminished by one unit of the number of pulses supplied during a measuring interval, said complement being measured with respect to the constant number of pulses supplied during an interval between two successive reference pulses. A setting of the counter corresponding to the number of pulses supplied during a measuring interval can therefore be obtained by switching over all counter trigger circuits. Before, however, this switch over is effected, for the reasons elucidated above, the trigger circuit C must be set, and it is set by a control pulse that flows by way of OR circuit 104 and AND circuit 111, which latter AND circuit is conductive at this moment because trigger circuits A and B are in the set state and trigger circuit C is in the reset state. Thereafter all trigger circuits A, B, C and D are in the set state, so that AND circuit 110 can let the next counting pulse pass. In the first place this pulse flows by way of OR circuits such as 118, 119, 121 to both control circuits of each counter trigger circuit, as a result of which, as has been described above, the counter trigger circuits are switched over to the condition in which they were not. The pulse that has passed AND circuit 110 also flows by cuit A, which is reset by it so that neither AND circuit 110 nor AND circuit 112 can any longer let pulses pass to the counter. Finally, the same pulse reaches by way of OR circuit 106 the right input circuit of trigger circuit D, and resets this trigger circuit. The counter now stores the value corresponding to the duration of the measuring interval, and hence can be read. The trigger circuits A, B, C, D and M in the counter control circuit are now in the same states as after a digitalizing operation in which the counting was started by a reference pulse received by way of conductor 101, so that the fact that the digitalising operation has been completed can be signalled in the same way to the data handling system that is to receive the result.

It is to be noted that it is not absolutely necessary to reset trigger circuit D at the end of a digitalizing operation if, because the counting operation was started by the end-pulse received by way of conductor 102, this trigger circuit has been set. In order to establish whether the digitalizing operation has been completed, it suffices to observe the trigger circuits M, A, B and C. In an arrangement in which the trigger circuit D is not reset at the end of a digitalizing operation, the OR circuit 106 and the connection by which this OR circuit can receive pulses that have passed the AND circuit 110, can be dispensed with, and the right control circuit of the trigger circuit can be connected directly to the output circuit of AND circuit 107.

It is the object of AND circuit 126 to prevent pulses from reaching the counter by way of one of the AND circuits 110 or 112 simultaneously with a pulse supplied by way of AND circuit 107 for the purpose of resetting the counter to its quiescent position, in case the counting circuit arrangement should accidentally be engaged in effecting a digitalizing operation at the moment at which a measuring order pulse is received. The simultaneous reception of such pulses might disturb the resetting operation of the counter and cause it to start its counting operation from a wrong position, which would lead to an erroneous digitalized value. The pulse that resets the counter to its quiescent position can only reach the counter if trigger circuit M is in its set state, and in this state it makes AND circuit 126 nonconductive, thus blocking the way for the counting pulses to the counter. At first sight it would appear superfluous to arrange a counter circuit, in which AND circuit 126 is present in such a way that the measuring order pulse sets trigger circuit C, for at that moment the AND circuits 113 and 114 are not necessary for preventing counting pulses from reaching the counter, but it is nevertheless desirable for trigger circuit C to be set so that, by means of AND circuit 127, it can prevent reference pulses from reaching the left input control circuit of trigger circuit A, and setting it prematurely. For corresponding reasons it is desirable to insert a similar AND circuit (shown in dotted lines in FIG. 1), controlled by trigger circuit C, in conductor 102 by way of which the end-pulses reach trigger circuit B and which prevents these end-pulses from reaching trigger circuit B as long as trigger circuit C is in the set state. During the digitalising operation trigger circuit C has the following tasks: It prevents trigger circuit A from being set again prematurely—that is, to say, before the counter has been read—after this trigger circuit has been reset, either by an additional counting pulse supplied to the counter, or by the pulse that is to switch over all the trigger circuits in the counter. Should the trigger circuit be set again prematurely, by a reference pulse, the counter might receive pulses once more which would cause it to obtain an erroneous setting. Furthermore, trigger circuit C creates the required time interval between the end-pulse or the reference pulse that marks the end of the counting operation, and appears at an arbitrary moment with respect to the counting pulses on the one hand, and either the additional pulse, supplied by way of AND circuit 112, or the pulse that is to switch over all the trigger circuits in the counter, and is supplied by way of AND circuit 110, on the other hand.

Figure 4:
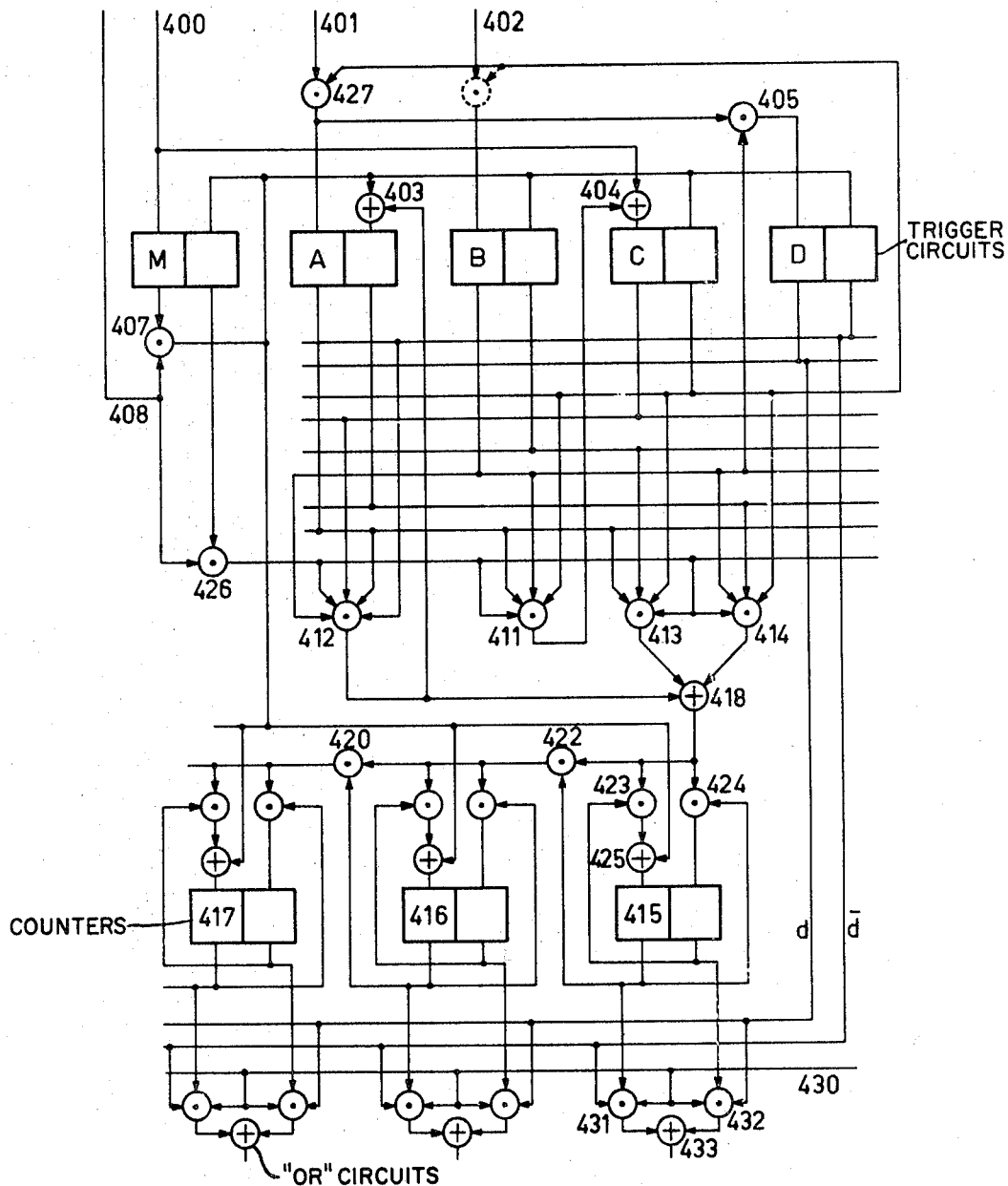
FIG. 4 shows another counter circuit for digitalzing values according to the invention.

If FIG. 4 is placed below FIG. 2, a circuit is obtained of an arrangement in which, depending on whether either the operation the counter is read by means of different sets of output circuits of the counter trigger circuits. In this arrangement the part of the circuit shown in FIG. 2 operates in exactly the same way already described in connection with the first embodiment, so that this part need not be described again.

Depending on the state of trigger circuit D. each trigger circuit storing a bit in the counter is read either by means of its left or by means of its right output circuit. For this purpose an AND circuit, controlled by trigger circuit D, is inserted in each of the output circuits of each trigger circuit storing a bit in the counter, AND circuit 431 in the left output circuit of counter trigger circuit 415, for instance, can only let the output voltage of this output circuit pass if trigger circuit D is in the reset state, while AND circuit 432, inserted in the right output circuit of trigger circuit D, can only let the voltage supplied by this output circuit pass if trigger circuit D is in the set state. In order to be able to let the output voltage of such an output circuit of a counter trigger circuit pass, such an AND circuit must, moreover, receive a reading order voltage or pulse by way of a third input circuit and of conductor 430. An OR circuit (433 for trigger circuit 415), connected to the output circuits of the two AND circuits belonging to the same counter trigger circuit, leads the trigger circuit output voltage, that is selected, in the way described, by the AND circuits, to the common reading conductor for the relative trigger circuit of the counter. If the counting operation in the circuit according to FIG. 4 has been started by a reference pulse received by way of circuit 401, this circuit operates exactly in the way described in connection with FIG. 1. As soon as the digitalizing operation has been completed, the trigger circuits M, A and D are in the reset state and trigger circuits B and C in the set state, and hence the counter is read by way of the left output circuits of the counter trigger circuits. If the counting operation has been started by the end-pulse received by way of conductor 402, the arrangement also operates in the same way as the arrangement according to FIG. 1, until trigger circuits A and D have been set by the reference pulse supplied by way of conductor 401, and trigger circuit C has been set by a pulse that is supplied by way of AND circuit 411. In the circuit now described the digitalising operation is then completed. In this condition of the circuit arrangement, trigger circuit M is in the reset state, while trigger circuits A, B, C and D are all in the set state. Trigger circuit D being in the set state, the counter is read by way of its right output circuits. In order to signal the fact that the digitalising operation has been completed to the data handling system that is to receive the result of this operation, a combination of two AND circuits and one OR circuit that can realize the Boolean formula:

$$\overline{M}.\overline{A}.B.C.\overline{D}+\overline{M}.A.B.C.D$$

can be used. This combination need not be shown in the FIG.

The last two figures in the reference numbers for corresponding parts in FIG. 1 and FIG. 4 are always the same, so that the operation of the arrangement shown in FIG. 4, in so far as this operation corresponds to that of the arrangement shown in FIG. 1, can be derived from the description of the operation of the latter arrangement.

It is to be noted that the FIG. shows the arrangement in simplified form, in so far as details are concerned that are not essential for the invention and are well-known in the art. A few of these details will now be considered.

When an AND circuit that operates as switching means in a pulse circuit is controlled by voltages, the supply of which is synchronized with the pulses, for instance because they are supplied by trigger circuits that are controlled by pulses from the source feeding the pulse circuit, it is always possible to select electric valves and delay times in such a way that the AND circuit will never suppress a part of a pulse, and will only let complete pulses pass. If, however, the supply of at least one of the voltages controlling the AND circuit is not synchronized with the pulse supply but may be received at arbitrary moment, as is the case with the control voltages supplied by the trigger circuits M, A and B, controlled by the measuring order pulse applied to circuit 100, and the pulses applied to the circuits 101 and 102, the moment at which such a control voltage becomes effective may be such that a pulse is mutilated. If such a mutilated pulse is used to control a plurality of trigger circuits the result may be that only a part of these trigger circuits react, and in this case the circuits does not operate correctly. There is a standard solution for this problem consisting in the insertion of pulse regeneration circuits in the output circuits of AND circuits controlled by nonsynchronized voltages. Such a regenerator comprises a one-shot pulse generator, such as a blocking oscillator, the operation of which is initiated by each pulse passing through the AND circuit. If this pulse is unmutilated or slightly mutilated, the one-shot generator supplies a complete pulse, but if the pulse is too seriously mutilated the one-shot generator does not operate at all. The circuit then waits for the next pulse, so that the only effect of the mutilation is a delay of one pulse, which in many circuits does not influence the measuring result but only causes a slight lengthening of the duration of the operation, and, in the circuits supplying the counting pulses to the counter, may cause an error equivalent to one pulse. Such regenerators are standard practice in data-handling systems. They are considered to be included, where necessary, in the AND circuits.

Moreover, it is standard practice to divide AND circuit that are inserted in pulse circuits into two separate AND circuits, a first AND circuit having only two input circuits, one input circuit receiving the pulses (as a rule through a condenser and another input circuit connected to the output circuit of an AND circuit controlled by the nonpulse voltages that are to control the passage of the pulses. For simplicity's sake these combinations of AND circuits have been shown as a single AND circuit.

I claim:

1. Arrangement for digitally establishing a measured value represented by the duration of a measuring interval limited by two electric signals, said arrangement comprising a binary counter having a plurality of trigger circuits, a source of counting pulses, a control arrangement provided with input circuits for said electric signals marking the beginning and end of a measuring interval and for a measuring order signal and including means for resetting said counter to a quiescent position situated one unit before its zero setting prior to digitalization, said control circuit responsive to said measuring order signal for switching to a first state, said control unit in said first state responsive to the first electric signal limiting a measuring interval following said measuring order signal for permitting said counter to count pulses supplied by said source of counting pulses, said control circuit responsive to the next electric signal limiting a measuring interval for switching to a second state for causing said counter to stop counting, said control circuit, if said next electric signal is the one of said electric signals marking the end of a measuring interval, supplying one further counting pulse to the binary counter to digitally establish said measured value in said counter, said control circuit, if said next electric signal is the one of said electric signals marking the beginning of a measuring interval, digitally establishing in said counter a value that is one unit lower than the complement of the setting of the counter reached during said counting.

2. Arrangement according to claim 1, wherein said value that is one unit lower than the complement of the setting of the counter reached during the counting is read by said control circuit arrangement switching over all of said trigger circuits in the counter.

3. Arrangement according to claim 1, wherein each counter trigger circuit has two output circuits, one of which provides the inversion of the signal provided by the other, and wherein said value that is one unit lower than the complement of the setting of the counter is read by said control circuit arrangement switching over each circuit provided for reading the setting of a counter trigger circuit from one output circuit of the trigger circuit to the other.

FO-1050
(5/69)

UNITED STATES PATENT OFFICE
CERTIFICATE OF CORRECTION

Patent No. 3551651          Dated     December 29, 1970

Inventor(s)    RIENK PIETER OFFEREINS

It is certified that error appears in the above-identified patent and that said Letters Patent are hereby corrected as shown below:

Col. 3, line 74, after "reason" insert -- this output voltage is first amplified in an amplifier 223--.

Col. 4, line 74, after "measured" insert -- value, provided that this measured value remains constant.--

Col. 6, line 36, cancel "1" (first occurrence).

Col. 7, line 11, after "conditions" change "." to --,--.

Col. 7, line 34, after "state" delete the period (.)

Col. 7, line 74, after "by" insert -- way of OR circuit 103 to the right control circuit of trigger cir- --.

Col. 8, line 74, after "the" insert -- reference pulse or the end-pulse has started the counting --.

Col. 9, line 11, after "counter" the "." should be --,--.

Col. 10, line 28, after "condenser" insert --,--.

Signed and sealed this 22nd day of August 1972.

(SEAL)
Attest:

EDWARD M. FLETCHER, JR.
Attesting Officer

ROBERT GOTTSCHALK
Commissioner of Pat